(12) United States Patent
Gava et al.

(10) Patent No.: US 8,955,005 B2
(45) Date of Patent: Feb. 10, 2015

(54) VIEWER BEHAVIOR TRACKING USING PATTERN MATCHING AND CHARACTER RECOGNITION

(71) Applicant: Samsung Electronics Co., Ltd., Gyeonggi-Do (KR)

(72) Inventors: Fabio Gava, Ladera Ranch, CA (US); Yingnan Zhu, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/830,739

(22) Filed: Mar. 14, 2013

(65) Prior Publication Data

US 2014/0282668 A1 Sep. 18, 2014

(51) Int. Cl.
*H04H 60/32* (2008.01)
*H04N 21/442* (2011.01)

(52) U.S. Cl.
CPC .............................. *H04N 21/44213* (2013.01)
USPC .................... 725/19; 725/17; 725/18; 725/20

(58) Field of Classification Search
USPC ...................................................... 725/17–20
See application file for complete search history.

(56) References Cited

U.S. PATENT DOCUMENTS 7,814,524 B2 10/2010 Candelore
2008/0127253 A1* 5/2008 Zhang et al. .................... 725/35

* cited by examiner

*Primary Examiner* — Hunter B Lonsberry
(74) *Attorney, Agent, or Firm* — Sherman IP LLP; Kenneth L. Sherman; Steven Laut

(57) ABSTRACT

A method for tracking user behavior includes providing multiple frames from a source to an electronic device, automatically capturing one of the multiple frames viewed on a display device connected to the electronic device based on an event, matching a pattern of the captured frame with a frame template by searching a plurality of frame templates, using the matched frame template to extract information from the captured frame, and storing the extracted information for tracking user behavior.

32 Claims, 11 Drawing Sheets

VIEWER BEHAVIOR TRACKING USING PATTERN MATCHING AND CHARACTER RECOGNITION

TECHNICAL FIELD

One or more embodiments relate generally to tracking user behavior and, in particular, to tracking user viewing behavior using pattern matching and character recognition.

BACKGROUND

Tracking viewers (e.g., viewers of a monitor or television (TV) set/system) is becoming more complex with behavior changing from a passive, linear program watching experience, to time-shifted and on-demand viewing experiences. Users may use a TV to play games (e.g., video games) and run different types of applications ("apps") on Smart TVs or a TV-connected device. Connected devices to TVs include set-top boxes (STB), Blu-ray players (BDP), game consoles and streaming devices.

The TV is usually not a gateway to the content; in most cases the TV is just acting as a monitor, outputting audio/video that is rendered by a connected device. Many households have a TV set connected to a set-top box from a multi-channel video programming distributor (MVPD), typically a cable, satellite, or Internet protocol TV (IPTV) provider. In this configuration, only audio and video is transferred from the connected device to the TV. Metadata, however, is not transferred, and the TV software cannot determine what is being viewed.

SUMMARY

In one embodiment, a method provides for tracking user behavior. One embodiment comprises a method that includes providing multiple frames from a source to an electronic device. In one embodiment, one of the multiple frames viewed on a display device connected to the electronic device is captured automatically based on an event. In one embodiment, a pattern of the captured frame is matched with a frame template by searching a plurality of frame templates. In one embodiment, the matched frame template is used to extract information from the captured frame. In one embodiment, the extracted information is stored for tracking user behavior.

One embodiment provides a system for tracking user behavior. In one embodiment, the system comprises a display device that receives multiple image frames from a source. In one embodiment, an electronic device is coupled to the display device. In one embodiment, the electronic device comprises a frame recognition module that automatically captures one of the multiple frames based on an event, matches a pattern of the captured frame with a frame template by searching a plurality of frame templates stored in a first memory, uses the matched frame template to extract information from the captured frame, and stores the extracted information in a second memory for tracking user behavior.

Another embodiment provides a non-transitory computer-readable medium having instructions which when executed on a computer perform a method comprising: providing multiple display frames from a source to an electronic device. In one embodiment, one of the multiple display frames viewed on a display device connected to the electronic device is automatically captured based on an event. In one embodiment, a pattern of the captured frame is matched with a frame template by searching a plurality of frame templates. In one embodiment, the matched frame template is used to extract information from the captured frame. In one embodiment, the extracted information is stored for tracking user behavior.

These and other aspects and advantages of the embodiments will become apparent from the following detailed description, which, when taken in conjunction with the drawings, illustrate by way of example the principles of the embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
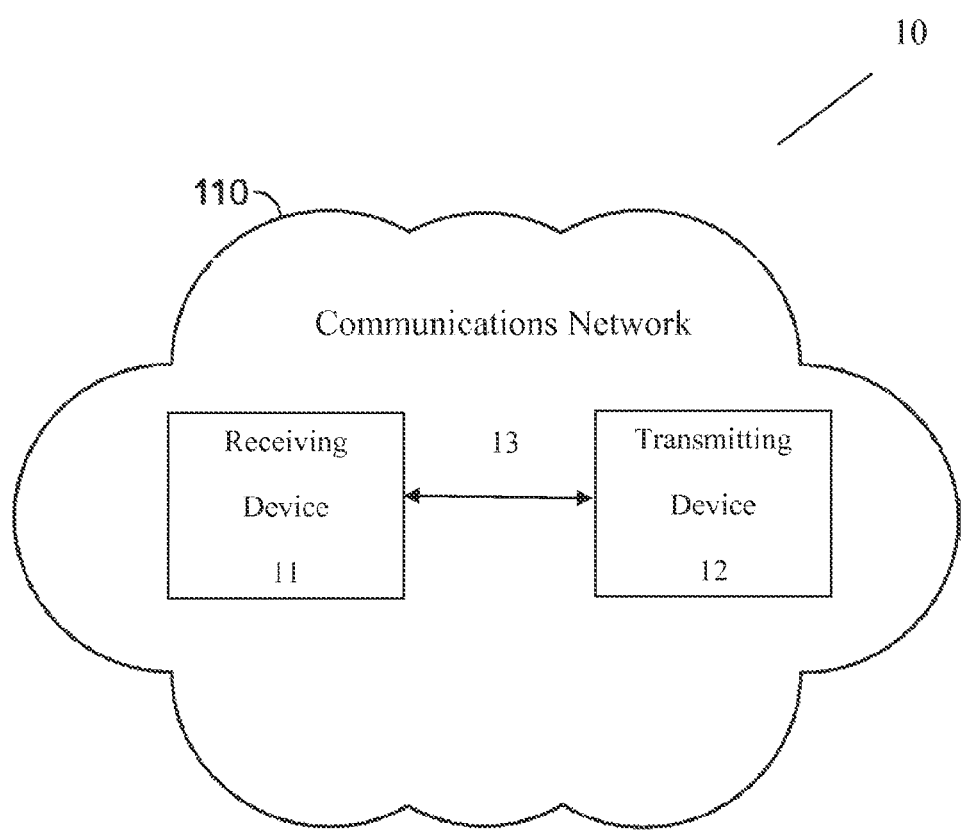
FIG. 1 shows a schematic view of a communications system, according to an embodiment.

The following description is made for the purpose of illustrating the general principles of the embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to automatically matching patterns displayed on an electronic device (e.g., a TV, monitor, etc.) based on triggered events, as well as periodically. Over-the-top (OTT) content providers, such as NETFLIX®, HULU®, and VUDU®, distribute their content directly to a TV (through apps) or to TV-connected consumer electronic (CE) devices, including game consoles, Blu-ray players and streaming devices. No matter what type of content or how it gets delivered to a TV, visual feedback to the user is ultimately displayed on the TV screen in the form of readable text. In one embodiment, display text on an electronic device is "read" using character recognition, such as optical character recognition (OCR). In one embodiment, the recognized text is recorded for detecting what the user is watching, reading, playing, or even listening to. In one embodiment, detecting what users watch and/or listen to may be used for tracking behavior and preferences for the purpose of improving user experience customization, content recommendation, targeted advertisement, among other uses.

One embodiment allows a video-displaying electronic device (e.g., TV, monitor, etc.) to inspect video frames automatically (e.g., at regular intervals) and/or based on an event (e.g., a recognized channel change, a remote control action, etc.) and apply pattern matching techniques and character recognition (e.g., OCR) to detect the content being consumed, and maintain track of user interactions with the content. In one embodiment, a database of known interface layouts of the multichannel video programming (MVPD) devices, game consoles, apps, games, etc. is generated and maintained. In one embodiment, for TV devices including an infrared (IR) blaster (e.g., via remote control) to control connected devices (e.g., a STB), a database may be automatically populated with templates generated from frames captured on the electronic device at a specific time right after a command is sent. In this embodiment, at the specific time after a command is sent, the system knows that the connected device is about to give the viewer a visual feedback for a particular action (e.g., channel change).

In one embodiment, through the comparison of frames before and after the event action is triggered, unique patterns of the user interface (UI) layout are identified on the connected electronic device. In one embodiment, the audio/video fingerprint database of all content that may be identified is not required. In one embodiment, once connected devices are identified, only the required templates may be downloaded to the electronic display device for pattern matching, which minimizes server infrastructure and conserves bandwidth. One or more embodiments are extendable to any kind of content (e.g., stationary graphics, video, etc.) consumed on an electronic display device (e.g., TV), such as music, books, web sites, etc.

In one embodiment, the electronic device comprises an electronic device capable of data communication over a communication link such as a wireless communication link. Examples of such an electronic device include stationary electronic devices, a mobile phone device, a mobile tablet device, etc. Examples of a stationary electronic device may include televisions, projector systems, etc. In one embodiment, a method provides for tracking user behavior using an electronic device. One embodiment comprises a method that includes providing multiple frames from a source to an electronic device. In one embodiment, one of the multiple frames viewed on a display device connected to the electronic device is captured automatically based on an event. In one embodiment, a pattern of the captured frame is matched with a frame template by searching a plurality of frame templates. In one embodiment, the matched frame template is used to extract information from the captured frame. In one embodiment, the extracted information is stored for tracking user behavior.

FIG. 1 is a schematic view of a communications system in accordance with one embodiment. Communications system 10 may include a communications device that initiates an outgoing communications operation (transmitting device 12) and communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include several transmitting devices 12 and receiving devices 11, only one of each is shown in FIG. 1 to simplify the drawing.

Any suitable circuitry, device, system, or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., a 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, communications network 110 may support protocols used by wireless and cellular phones and personal email devices (e.g., a Blackberry®). Such protocols can include, for example, GSM, GSM plus EDGE, CDMA, quad-band, and other cellular protocols. In another example, a long range communications protocol can include Wi-Fi and protocols for placing or receiving calls using VOIP or LAN. Transmitting device 12 and receiving device 11, when located within communications network 110, may communicate over a bidirectional communication path such as path 13. Both transmitting device 12 and receiving device 11 may be capable of initiating a communications operation and receiving an initiated communications operation.

Transmitting device 12 and receiving device 11 may include any suitable device for sending and receiving communications operations. For example, transmitting device 12 and receiving device 11 may include a television system, a device with audio video capabilities, tablets, and any other device capable of communicating wirelessly (with or without the aid of a wireless enabling accessory system) or via wired pathways (e.g., using traditional telephone wires). The communication operations may include any suitable form of communication, including for example, voice communication (e.g., telephone calls), data communication (e.g., e-mails, text messages, media messages), or combinations of these (e.g., video conferences).

Figure 2:
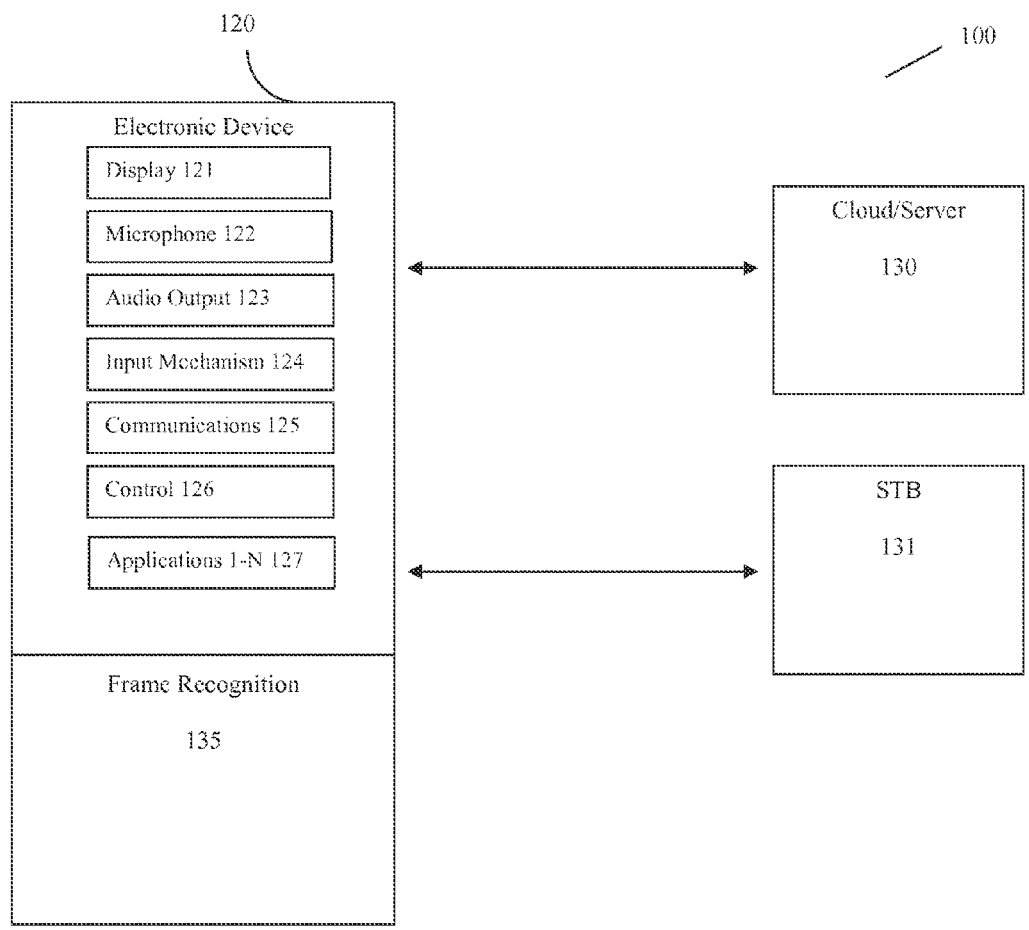
FIG. 2 shows a block diagram of an architecture system for tracking user viewing behavior using pattern matching and character recognition on an electronic device, according to an embodiment.

FIG. 2 shows a functional block diagram of an architecture system 100 that may be used for tracking user behavior for an electronic device 120, according to an embodiment. Both transmitting device 12 and receiving device 11 may include some or all of the features of electronics device 120. In one embodiment, the electronic device 120 may comprise a display 121, a microphone 122, audio output 123, input mechanism 124, communications circuitry 125, control circuitry 126, a frame recognition module 135, and any other suitable components. In one embodiment, the frame recognition module 135 may comprise a separate component connected to the electronic device 120. In one embodiment, applications 1-N 127 are provided by providers (e.g., third-party providers, developers, etc.), where N is a positive integer equal to or greater than 1, and may be obtained from the cloud or server 130, communications network 110, etc. In one embodiment, STB 131 provides programming to the electronic device 120. In one embodiment, the STB 131 may provide the applications 1-N 127 to the electronic device 120.

In one embodiment, all of the applications employed by audio output 123, display 121, input mechanism 124, communications circuitry 125, and microphone 122 may be interconnected and managed by control circuitry 126. In one embodiment, audio output 123 may include any suitable audio component for providing audio to the user of electronics device 120. For example, audio output 123 may include one or more speakers (e.g., mono or stereo speakers) built into electronics device 120. In some embodiments, audio output 123 may include an audio component that is remotely coupled to electronics device 120. For example, audio output 123 may include a headset, headphones or earbuds that may be coupled to a communications device with a wire (e.g., coupled to electronics device 120 with a jack) or wirelessly (e.g., Bluetooth® headphones or a Bluetooth® headset).

In one embodiment, display 121 may include any suitable screen or projection system for providing a display visible to the user. For example, display 121 may include a screen (e.g., an LCD screen) that is incorporated in electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen, a remote control, a voice activated system (e.g., automatic speech recognition (ASR), etc.).

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., a 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, flash memory, ROM, and/or RAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), Internet social media apps, on-demand movie apps, etc. In some embodiments, the electronics device 120 may include one or several applications operative to perform communication operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include the microphone 122 to allow the user to transmit audio (e.g., voice audio) for speech control and navigation of applications 1-N 127, during a communications operation or as a means of establishing a communications operation or as an alternate to using a physical user interface. The microphone 122 may be incorporated in the electronics device 120, or may be remotely coupled to the electronics device 120. For example, the microphone 122 may be incorporated in wired headphones; the microphone 122 may be incorporated in a wireless headset or may be incorporated in a remote control device, etc.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
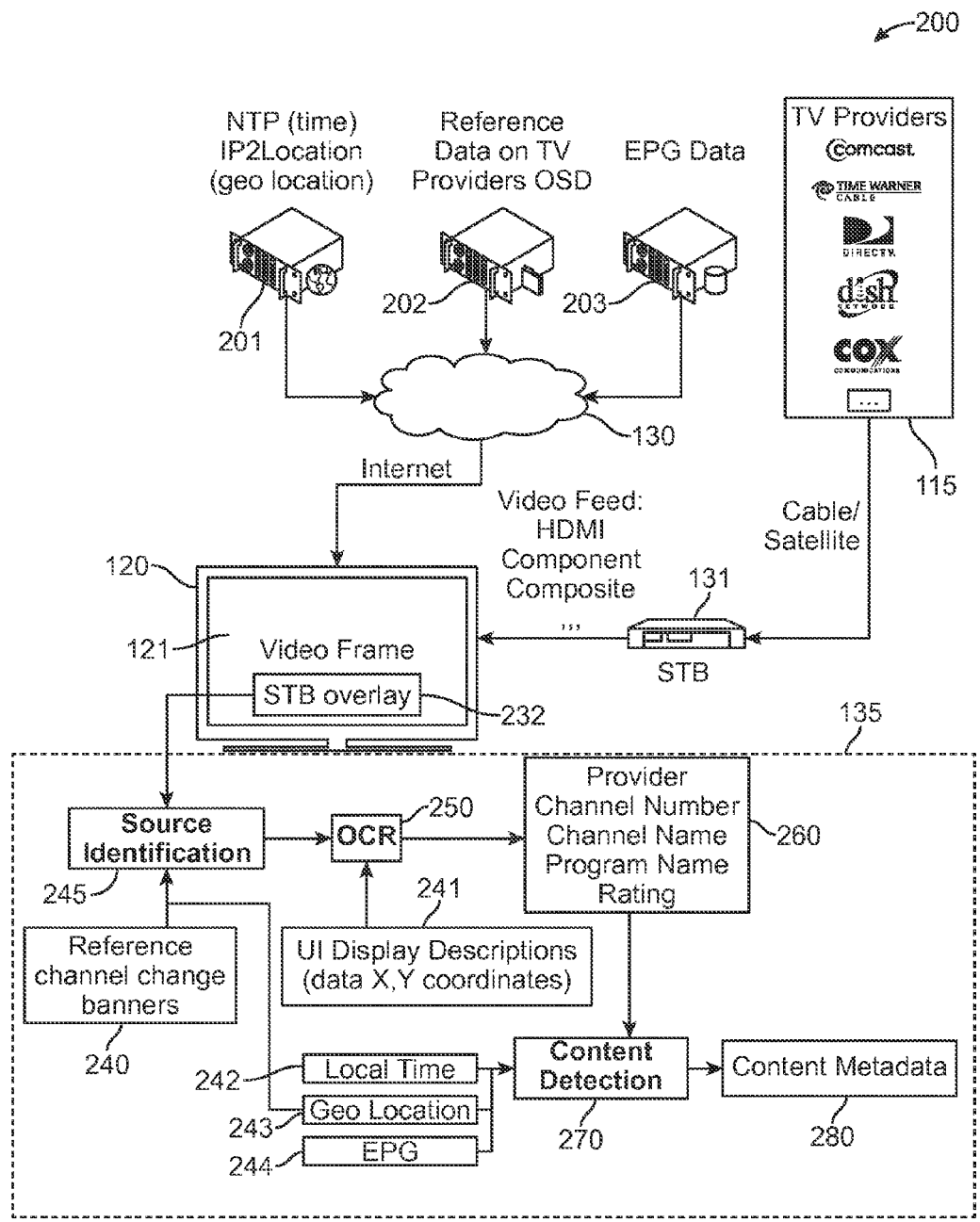
FIG. 3 shows another block diagram of an architecture system tracking user viewing behavior using pattern matching and character recognition on an electronic device, according to an embodiment.

FIG. 3 shows another block diagram of an architecture system 200 tracking user viewing behavior using pattern matching and character recognition on an electronic device 120, according to an embodiment. In one embodiment, the frame recognition module 135 may execute within the display 121 (or rendering device), which has access to a video frame buffer. In one embodiment, the recognition module 135 has partial or no information about the display frame (e.g., video frame) being displayed on the display 121. In one embodiment, the system 200 comprises network time protocol (NTP) time provider and IP2Location provider 201, on-screen display (OSD) reference data provider 202, electronic programming guide (EPG) provider 203, cable/satellite providers 115, STB 131, cloud/server 130 and electronic device 120.

In one embodiment, the display 121 receives a video signal from a variety of sources, including the STB 131, the Internet (e.g., via an embedded browser), or cloud/server 130, BDP, game consoles, digital streaming devices, PCs, tablet computing devices, cell phones, camera, etc. In one embodiment, the source is connected to the display 121 using any type of audio/video connection including the following: HDMI, DVI, RGB composite, component, wireless connectivity or other hard wired connections over a network, etc.

In one embodiment, a database of frame templates that contain entries describing frame patterns to be matched (with display frames provided on the display 121), and OCR masks for a particular screen layout to be recognized may be stored on the electronic device 120 in a memory (e.g., a memory module, memory device, etc.) or stored in a memory in a cloud computing environment (e.g., in cloud/server 130). In one embodiment, a template may include the following information: the device/app/event to which the template corresponds (e.g., loading screen of the STB, splash screen of an app, channel change banner of an STB, etc.), crop area to be used in pattern matching to identify the particular screen layout, an OCR mask (e.g., indicating coordinates or position where text is displayed or other graphic features may be found. In one embodiment, the mask indicates rectangular areas within the frame) for extracting various pieces of information, crop area to be used in pattern matching to extract information (e.g., rating represented as stars), training data to be used in OCR, information to be used for pre-processing the image (e.g., a matching metric value, a matching threshold value, etc.).

In many embodiments, there is no need to extract all of the information from the display frame itself, but just a unique identifier of the content or entity, such as a movie name, a TV show, music description or song name, a contact name, etc. In one embodiment, additional information about the content or entity may be looked up in supporting databases (e.g., stored on the cloud/server 130, obtained over the Internet, etc.). In one example, the channel change banner displayed by STBs may be used for the display of information (e.g., STB overlay banner 232). In one embodiment, the frame recognition module 135 extracts the channel number of a display frame, and based on the cable/satellite provider 115 and location provided by IP2Location 201 or provided by a user (e.g., during configuration) to the geo-location input 243, the channel name and current program may be looked up in an electronic programming guide (EPG) database provided by EPG data 203 to a EPG input 244.

In one embodiment, the frame recognition module 135 comprises a source identification module 245, reference, channel change and banner recognition module 240, OCR module 250, UI display descriptions module 241, local time input 242, geo-location input 243, EPG input 244, display frame OCR results module 260, content detection module 270, and content metadata module 280.

In one embodiment, the frame recognition module 135 automatically extracts display frames from the video buffer of the display 121 at regular intervals, such as every few seconds (e.g., 2, 3, 5, etc.), similar as required for humans to read or perceive information on a display screen. In one embodiment, if the currently selected video input source has not yet been identified for template matching by the source identification module 245, the frame recognition module 135 uses heuristics to narrow down the search space. In one example, geo-location input 243 from a GPS receiver (e.g., in electronic device 120) and IP-to-location service (e.g., IP2Location 201 information) may be used to reduce the number of cable/satellite providers 115 available in a certain area, which reduces the number of frame templates that need to be searched for a match.

In one embodiment, for devices compliant with Consumer Electronics Control (CEC) connected to an HDMI port, the source identification module 245 narrows down frame templates to be searched for matching to those only pertaining to screen layouts observed on these types of devices. In one embodiment, the source identification module 245 reduces the frame template search domain for matching based on only looking for frame templates of MVPD providers that use the detected particular device brand/model of an STB 131 connected to the electronic device 120.

In one embodiment, if a frame template is matched and it uniquely identifies the device connected to the input source (e.g. an Xbox® connected to HDMI-2 input of the electronic device 120), the source identification module 245 uses this configuration to narrow down the frame template search space to only Xbox® screen frame templates when the HDMI-2 input source is selected for electronic device 120. In one embodiment, if the input source has already been identified, such as a COX® set-top box, the source identification module 245 attempts to match only relevant frame templates, in this case channel change banner, Digital Video Recorder (DVR) playback banner, trickplay operations (e.g., pause, rewind, fast forward, etc.), Video-on-Demand (VOD) list of titles, etc. using the reference, channel change and banner recognition module 240.

In one embodiment, once a particular frame template is matched, the frame recognition module 135 performs the data extraction from the display frame using the matched frame template for the different data points, records the data points and updates template matching priority. In one embodiment, a template matching priority may be applied at any point in time by sorting the relevant frame templates based on the likelihood of them following a previously matched frame template. In one example, once a VOD list of title is identified, the frame recognition module 135 associates the highest priority to a title details page, which is normally displayed when a user selects a particular title to watch.

In one embodiment, in the template matching process, the desired area is cropped first from the original image based on the information in the frame templates, such as the coordinates of the banner area determined by the UI display descriptions module 241. In one embodiment, if there is transparency in the UI, the transparency is removed. In one embodiment, using the frame template mask (e.g., the common pixels appearing in the frames banner area), the frame recognition module 135 performs pixel level matching. In one embodiment, the possible matching metric may be Mean Absolute Error (MAE), Peak Signal to Noise Ratio (PSNR), and any other image quality evaluation metric. In one embodiment, once the matching result satisfies the threshold requirement, the result is finding a matching frame template. In one embodiment, the frame template is stored in a memory (e.g., on the electronic device 120, in the cloud/server 130, etc.) and a mapping between the frame template and the TV input source is created. In one embodiment, frequency domain matching may be used, which includes before and after the matching, a forward and reverse transformation is performed to the cropped image.

In one embodiment, after the frame template matching the OCR module 250 performs character recognition via OCR. It is noted that typical available OCR solutions are focused on identifying text in large text documents. This means the ideal input of typical OCR modules is a black and white text file with a large amount of words. However, the text in most of the programming banners and applications are usually large art fonts, which prevents the typical OCR from obtaining the correct results. To solve this problem, in one embodiment, pre-processing and post-processing steps are used when applying OCR by the OCR module 250 in the cropped text area. In one embodiment, pre-processing is used by the OCR module 250 to extend the text area with the same background color and add additional known text in the same fonts to the text area. After that, the OCR module 250 may obtain the result from the new text area. In one embodiment, in the post-processing, the OCR module 250 removes the added text to recover the desired text in the original image. In one embodiment, after the OCR module 250 completes processing, the results are provided to the display frame OCR results module 260.

In one embodiment, another aspect comprises building a cloud-based database of frame templates in a semi-automated or automated fashion. Some TV devices feature an IR blaster for controlling connected devices and, in particular, STBs. In one embodiment, the user is asked to select from a list of supported MVPDs, a location (Zip code), and a STB device model. With that information, the electronic device 120 is capable of sending the right IR command to the STB device (e.g., STB 131) and also lookup EPG information for the viewer's service provider (e.g., cable/satellite provider 115) at the specified geographical location. In one embodiment, in this configuration the frame recognition module 135 may capture display frames from the video buffer of the display 121 after the IR command is sent, and compare the display frames to identify distinct features of the UI that are common to the particular device interface layout. In one embodiment, the OCR module 250 may locate the OCR areas based on expected text. In one embodiment, the frame recognition module 135 may learn the common patterns used by the channel change banner and knowing what channel the STB (e.g., STB 131) will be tuned to for determining where the channel number and name will be displayed, as well as the program name, duration, etc.

Once the information is obtained from the OCR module 250, the local time input 242, geo-location input 243 and EPG input 244 are also added to the content detection module 270. The result of the obtained information from the modules of the frame recognition module 135 is then stored in memory as content metadata by the content metadata module 280. In one embodiment, the content metadata includes information including the user's viewing habits including what is viewed, when it is viewed, how long it is viewed, the changes in viewing, etc. This information may then be used for such purposes as: marketing, determining likes/dislikes, determining viewer content to be delivered, etc.

Figure 4:
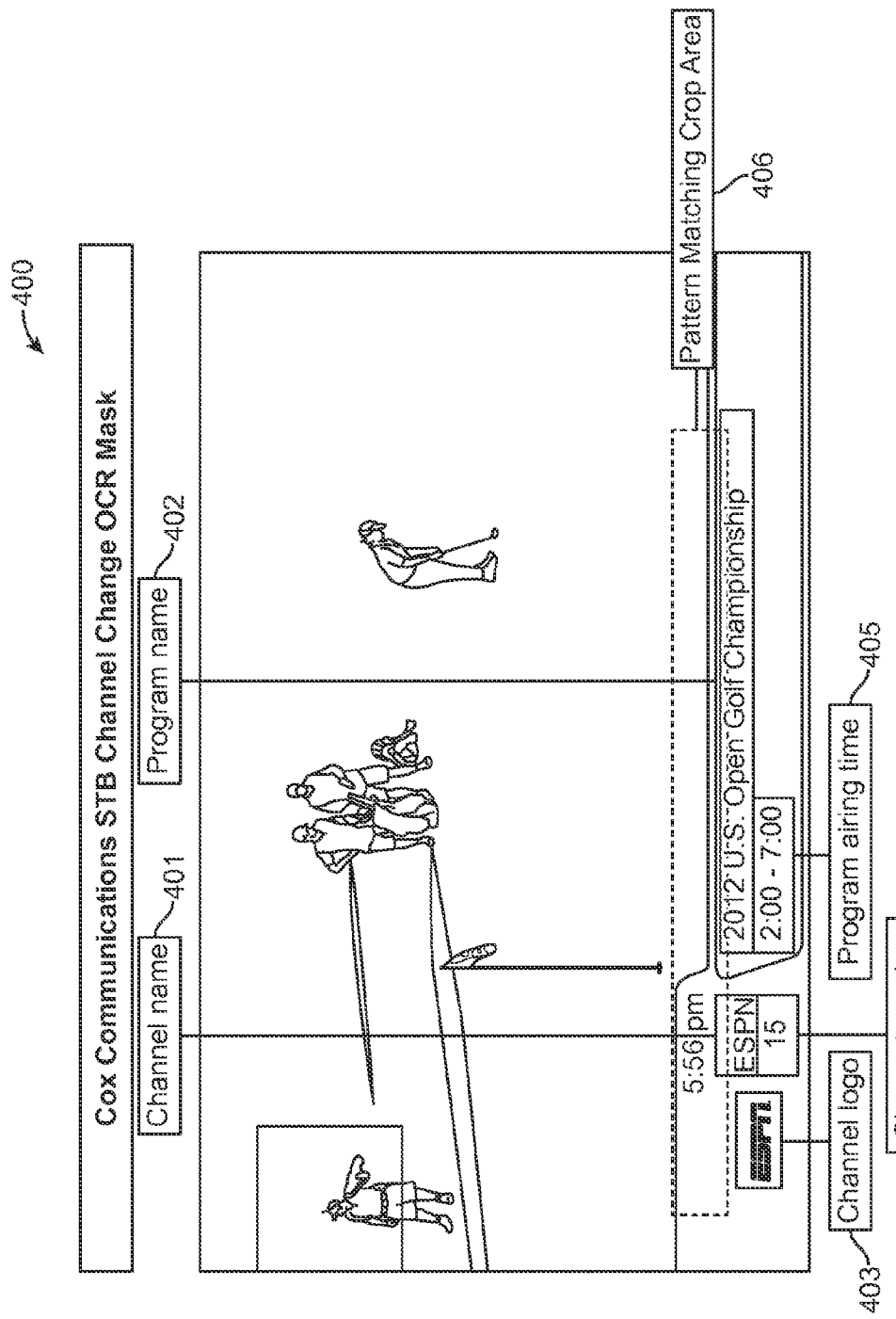
FIG. 4 shows an example template for tracking user viewing behavior using pattern matching and character recognition on an electronic device, according to an embodiment.

FIG. 4 shows an example display frame 400 used for tracking user viewing behavior using pattern matching and character recognition on an electronic device 120, according to an embodiment. In the example viewing display frame 400, included in the display frame are channel name 401, program name 402, channel logo 403, channel number 404, and program airing time 405. In one embodiment, for the display frame 400, the pattern matching crop area 406 shows a portion that may be used for frame template matching. For this example display frame, a frame template for the COX® STB may be used so that the indicated information (e.g., channel name 401, program name 402, channel logo 403, channel number 404, and program airing time 405) may be obtained through use of the frame recognition module 135.

Figure 5:
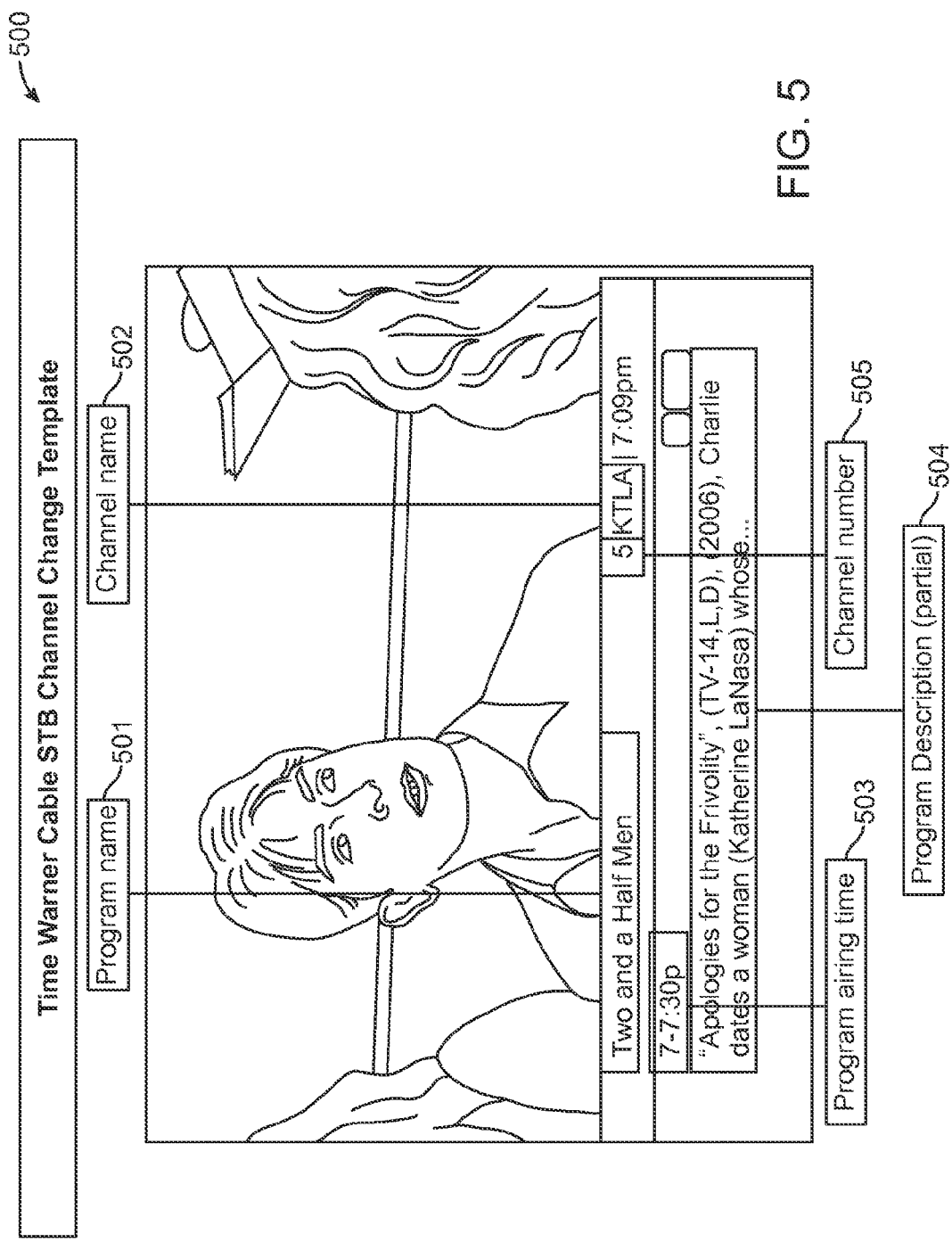
FIG. 5 shows another example template for tracking user viewing behavior using pattern matching and character recognition on an electronic device, according to an embodiment.

FIG. 5 shows an example display frame 500 used for tracking user viewing behavior using pattern matching and character recognition on an electronic device 120, according to an embodiment. In the example display frame 500, included in the display frame are program name 501, channel name 502, program airing time 503, program description 504 (partial), and channel number 505. For this example display frame, a frame template for the TIME WARNER® STB may be used so that the indicated information (e.g., program name 501, channel name 502, program airing time 503, program description 504 (partial) and channel number 505) may be obtained through use of the frame recognition module 135.

Figure 6:
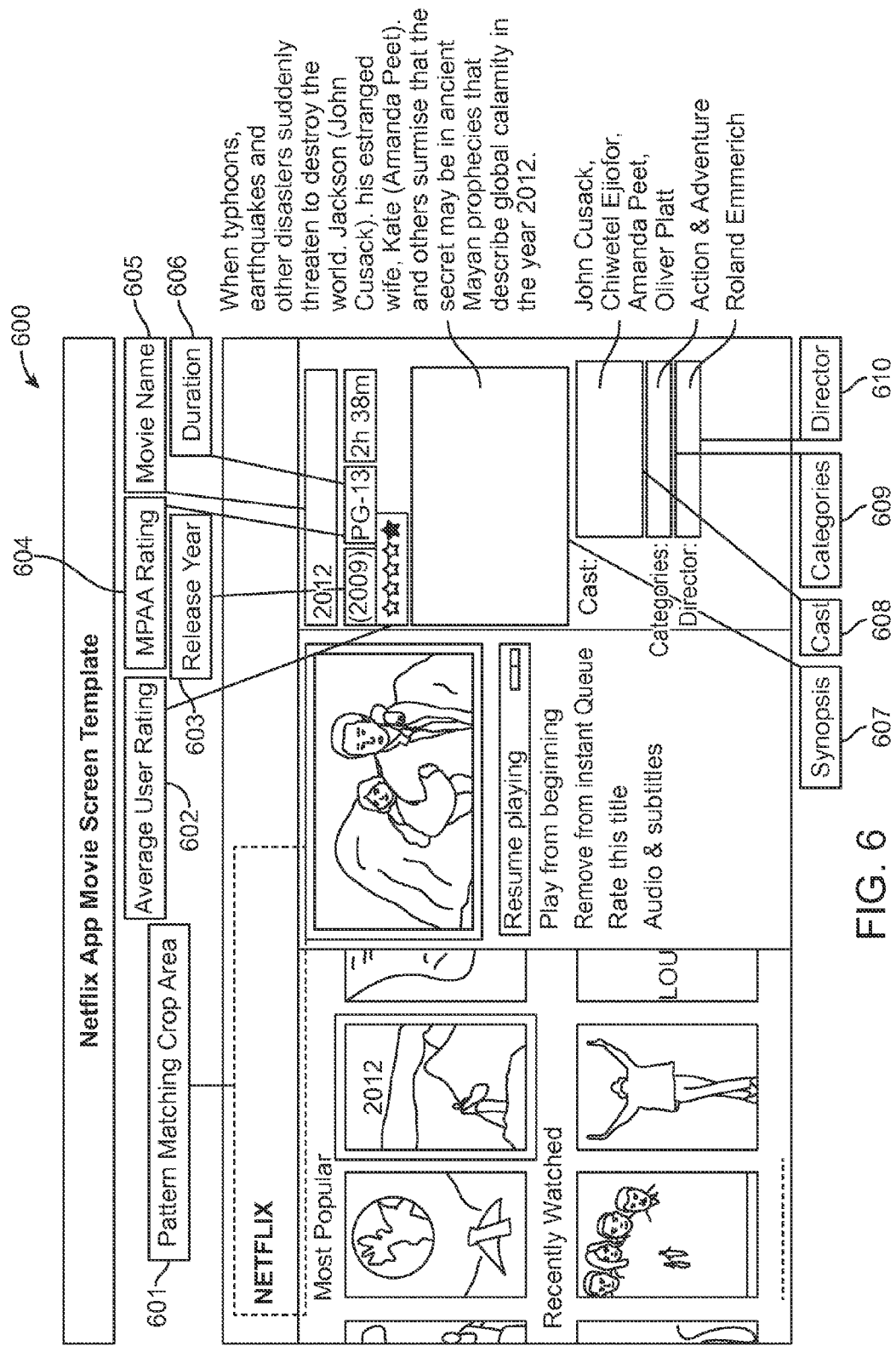
FIG. 6 shows an example template for tracking user viewing behavior using pattern matching and character recognition on an electronic device, according to an embodiment.

FIG. 6 shows an example display frame 600 used for tracking user viewing behavior using pattern matching and character recognition on an electronic device 120, according to an embodiment. In the example display frame 600, included in the display frame are a pattern matching crop area 601, average user rating 602, release year 603, MPAA rating 604, movie name 605, duration 606, synopsis 607, cast 608, categories 609, and director 610. In one embodiment, for the display frame 600, the pattern matching crop area 601 shows a portion that is used for frame template matching. For this example display frame, a frame template for the NETFLIX® App may be used so that the indicated information (e.g., average user rating 602, release year 603, MPAA rating 604, movie name 605, duration 606, synopsis 607, cast 608, categories 609, and director 610) may be obtained through use of the frame recognition module 135. It should be noted that other available information (e.g., any text information) included in display frames may be extracted according to one embodiment.

Figure 7:
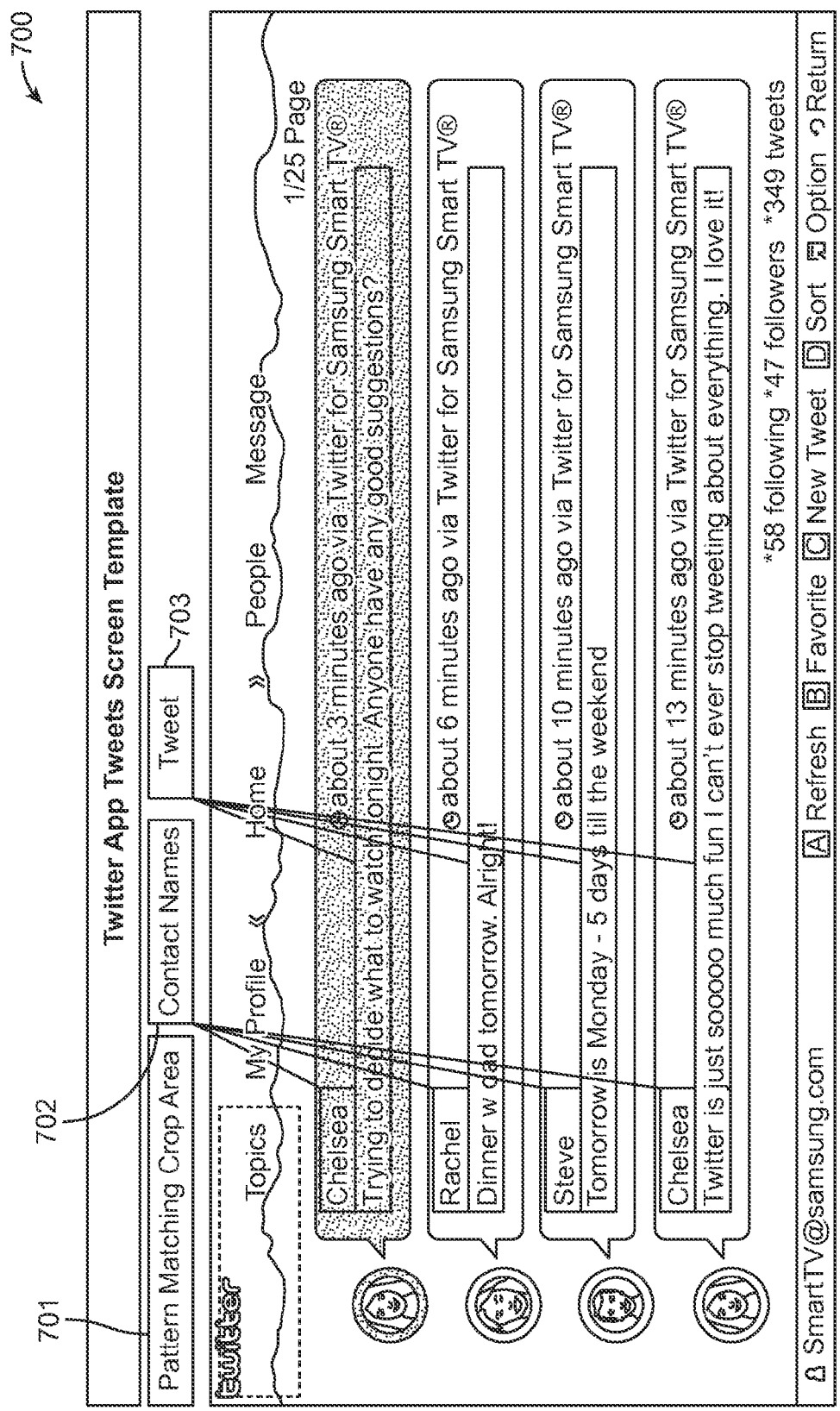
FIG. 7 shows an example template for tracking user viewing behavior using pattern matching and character recognition on an electronic device, according to an embodiment.

FIG. 7 shows an example display frame 700 used for tracking user viewing behavior using pattern matching and character recognition on an electronic device 120, according to an embodiment. In the example display frame 700, included in the display frame are a pattern matching crop area 701, contact names 702, and TWEETS® 703. In one embodiment, for the display frame 700, the pattern matching crop area 701 shows a portion that is used for frame template matching. For this example display frame, a frame template for the TWITTER® App may be used so that the indicated information (e.g., contact names 702 and TWEETS® 703) may be obtained through use of the frame recognition module 135.

Figure 8:
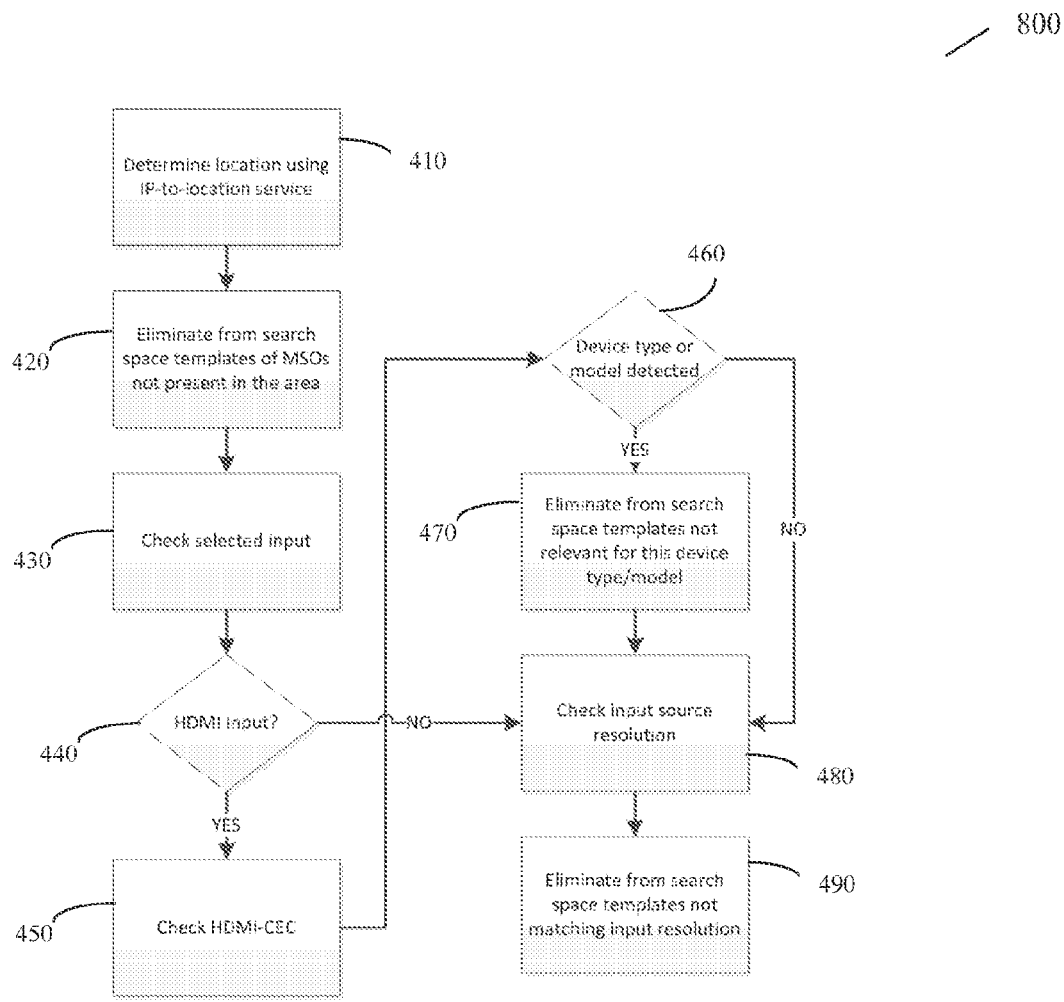
FIG. 8 is an example flow chart for a process for reducing a search space for templates, according to an embodiment.

FIG. 8 is an example flow chart 800 for a process for reducing a search space for frame templates, according to an embodiment. In one embodiment, in block 410, location is determined using an IP-to-location service (e.g., IP2Location 201) or a GPS receiver. In one embodiment, in block 420, MSOs that are found to be not available in the area (i.e., do not service the surrounding location) based on the received location information are used to eliminate those frame templates from the search domain that correspond to the unavailable MSOs for reducing the space/domain of the search for a matching frame template. In one embodiment, in block 430, the selected input source is detected (e.g., HDMI, DVI, RGB, component, composite, etc.). In one embodiment, the type of input content may also be used for reducing templates, such as audio, video, audio-visual, linear pulse code modulation (LPCM), Dolby® Digital, digital theatre systems (DTS), etc.). In one embodiment, in block 440, it is determined whether the detected input is an HDMI input. In one embodiment, if the detected source input is an HDMI input, the flow chart 800 proceeds to block 450, otherwise the flow chart 800 proceeds to block 480.

In one embodiment, in block 450, the source device is checked to determine whether it is an HDMI-CEC device (e.g., a video game platform, such as a Play Station 3). In one embodiment, if the source device supports HDMI-CEC and has it enabled, then the device sends identification and capability information during a CEC handshake. In one embodiment, this information allows the TV device to determine the device type and/or model, which may assist to narrow down the template search space. If CEC information is not received (e.g., the HDMI-CEC feature is not enabled), no templates are eliminated from the search space.

If the source device is or is not an HDMI-CEC device, the flow chart 800 proceeds to block 460 using this information to assist in determining the device type and/or model for detection. In block 460, if the device type or model is detected, the flow chart 800 proceeds to block 470, otherwise the flow chart 800 proceeds to block 480.

In one embodiment, in block 470, the frame templates that are not relevant to the detected device type or model are eliminated from the search for frame templates for reducing the space/domain of the search for a matching frame template. In one embodiment, in block 480, the input source device resolution is determined. In one embodiment, in block 490, based on the determined resolution, the frame templates that are not relevant to the determined input resolution are eliminated from the search for frame templates to reduce the space/domain of the search for a matching frame template.

Figure 9:
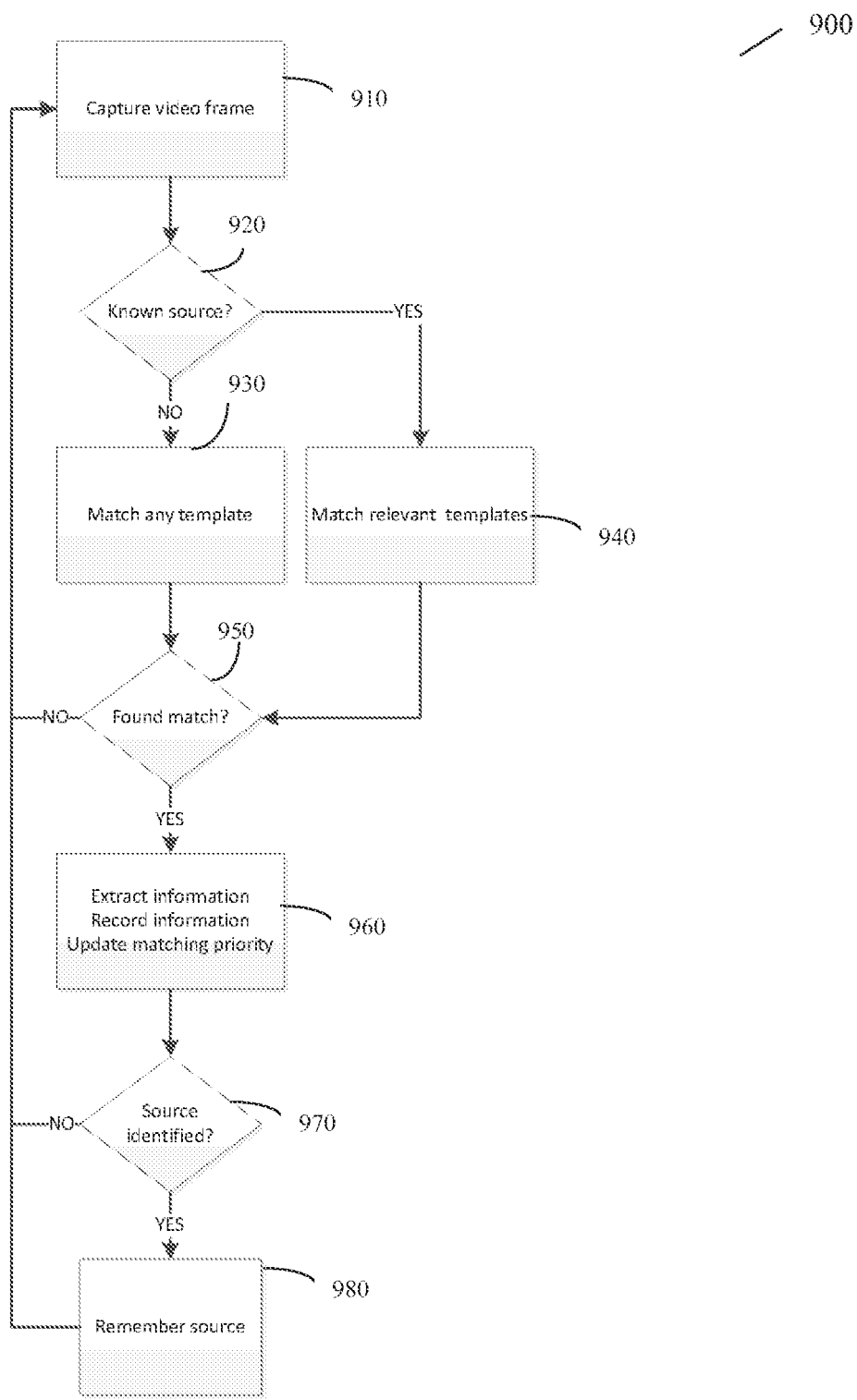
FIG. 9 is an example flow chart for a process for extracting data for tracking user viewing behavior using pattern matching and character recognition on an electronic device, according to an embodiment.

FIG. 9 is an example flow chart 900 for a process for extracting data for tracking user viewing behavior using pattern matching and character recognition (e.g., OCR) on an electronic device (e.g., electronic device 120), according to an embodiment. In one embodiment, in block 910, a display frame (e.g., video frame) is captured from multiple display frames that are viewable on a display device (e.g., display 121, FIG. 2, FIG. 3). In one embodiment, in block 920, it is determined whether the captured display frame is from a known source. In one embodiment, if it is determined that the captured display frame is from a known source (e.g., using flow chart 800), the flow chart 900 continues to block 940; otherwise, the flow chart 900 continues to block 930.

In one embodiment, in block 940, the determined source is used to search for a matching frame template from multiple stored frame templates (e.g., in a database in memory of an electronic device, stored in a database on a cloud/server, etc.). In block 930, a search is conducted over all of the frame templates (that have not been able to be eliminated, if any). In one embodiment, in block 950, it is determined if a match is found for a frame template for the captured display frame. If a match has been found, the flow chart 900 continues to block 960; otherwise, the flow chart 900 continues back to block 910.

In one embodiment, in block 960, information (e.g., channel name, program name, airing time, TWEET®, rating, etc.) is extracted from the captured display frame using the matched template, the information is recorded/stored, and the matching priority for the frame template is updated. In one embodiment, block 970 determines if the source has now been identified based on the extracted information. If the source is identified, the flow chart proceeds to block 980 where the source of the display frame is remembered by storing this information in memory. In one embodiment, the flow chart 900 proceeds back to block 910 for capturing another display frame automatically based on a predetermined interval (e.g., periodically every few seconds (e.g., 2, 3, 4, 5, 10, etc.) or based on an event (e.g., a remote control action, a channel change, etc.)).

Figure 10:
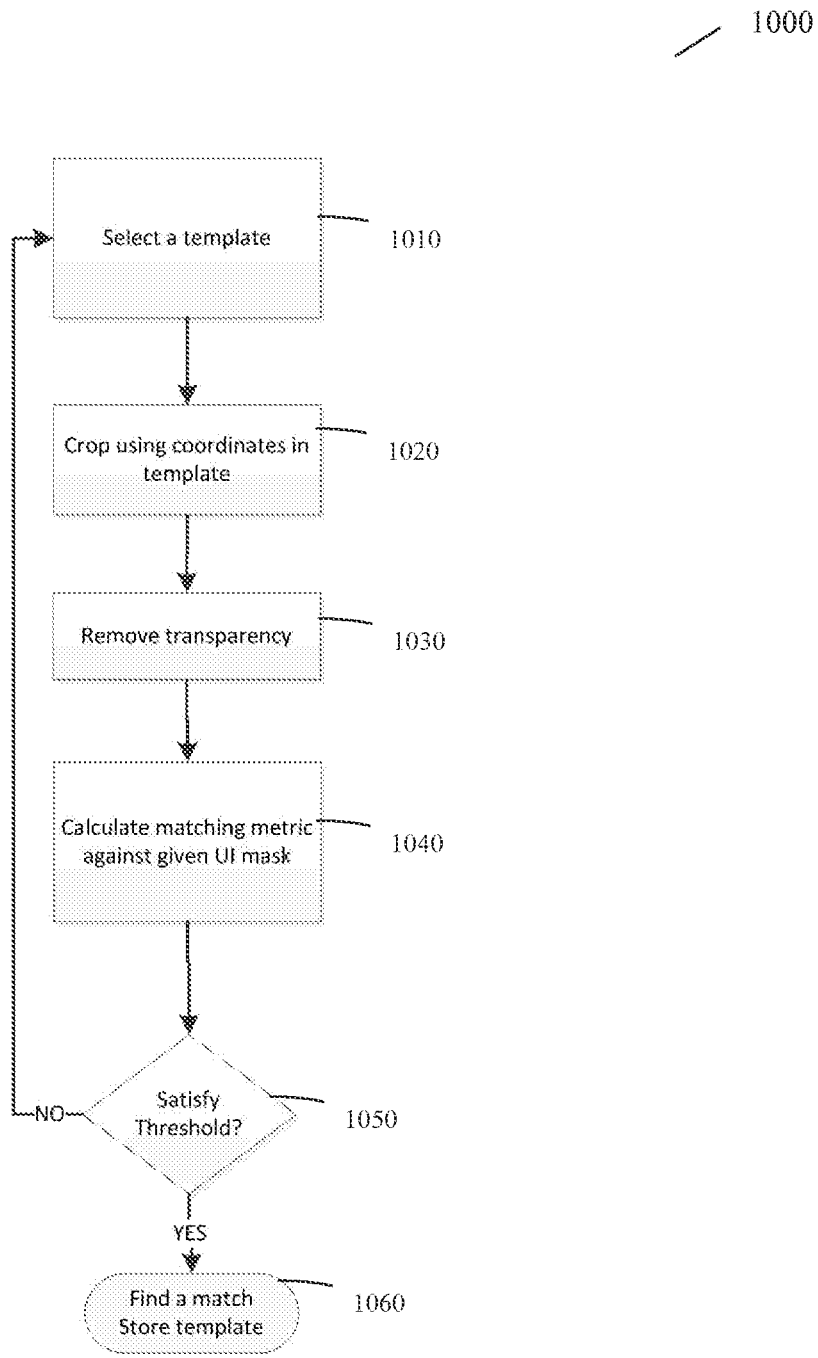
FIG. 10 is an example flow chart for a process for template matching for tracking user viewing behavior using pattern matching and character recognition on an electronic device, according to an embodiment.

FIG. 10 is an example flow chart 1000 for a process for template matching for tracking user viewing behavior using pattern matching and character recognition (e.g., OCR) on an electronic device (e.g., electronic device 120, FIG. 2, FIG. 3), according to an embodiment. In one embodiment, in block 1010, a frame template is selected (e.g., based on using flow chart 800, flow chart 900). In one embodiment, in block 1020, a captured display frame is cropped based on using crop coordinates in the selected frame template. In block 1030, if transparency is found in the captured display frame, it is removed. In block 1040, a matching metric is calculated based on the UI mask (e.g., MAE, PSNR, etc.). In one embodiment, the result of the matching metric calculation is used in block 1050 to determine is a selected threshold comparison for a match is satisfied or not. If the results satisfy the threshold comparison, the flow chart 1000 continues to block 1060 where the match for a frame template for the captured display image has been found, and the frame template is stored in memory (e.g., on an electronic device 120, on the cloud/server 130, etc.). If the threshold comparison with the metric result is not satisfied (i.e., the result is below the desired threshold), the flow chart 1000 continues to block 1010.

Figure 11:
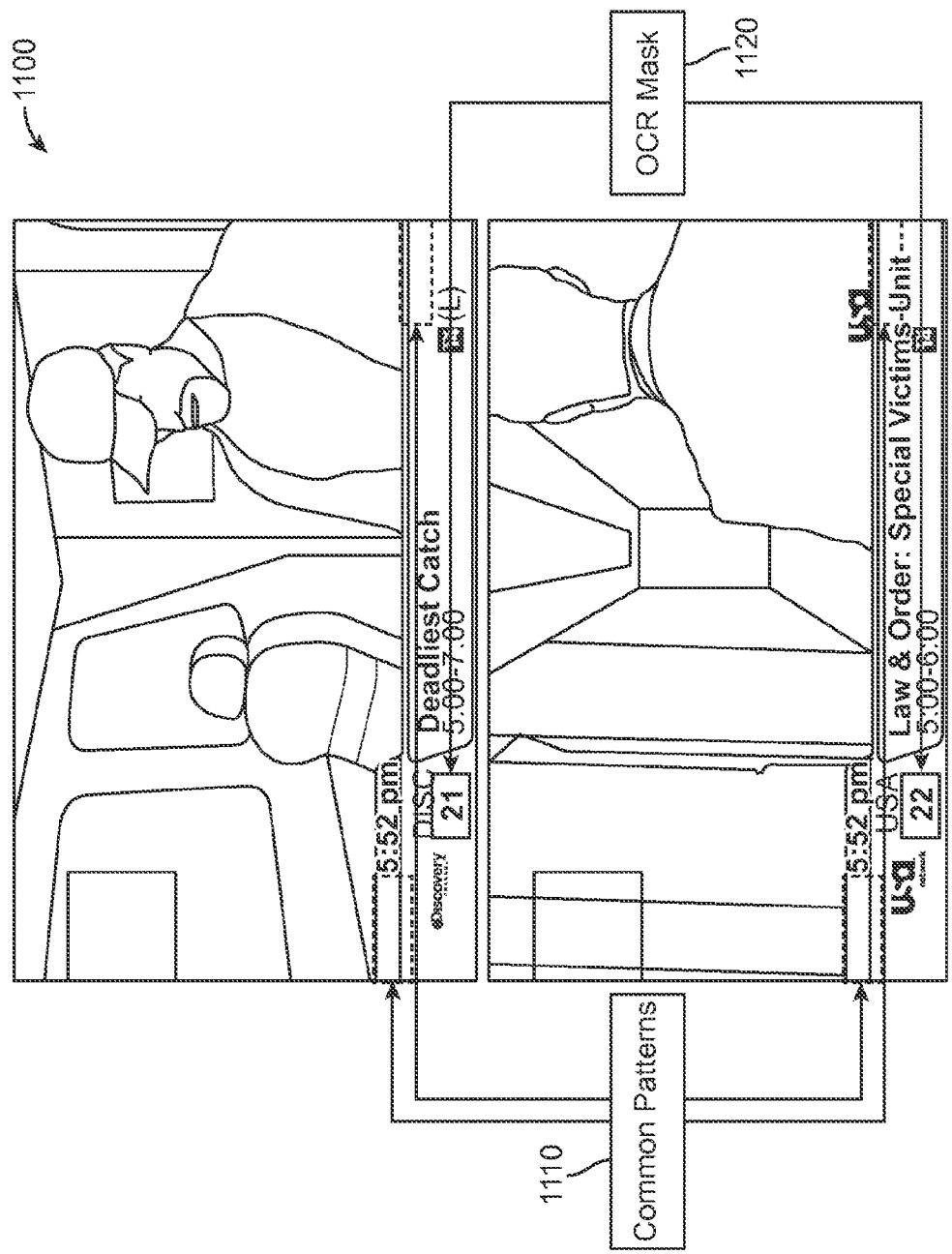
FIG. 11 is an example frame showing use of a channel change banner for tracking user viewing behavior using pattern matching and character recognition on an electronic device, according to an embodiment.

FIG. 11 is an example display frames 1100 showing use of a channel change banner for tracking user viewing behavior using pattern matching and character recognition (e.g., OCR) on an electronic device (e.g., electronic device 120), according to an embodiment. In one embodiment, the example display frames are captured after a remote control action has been made (e.g., a channel change IR command). Example common patterns 1110 and an example OCR mask 1120 are shown, where the OCR mask 1120 is selected based on the knowledge of where relevant information is located on the display frames. In the example display frames 1100, the channel change action is made for an STB from COX® communications. In one embodiment, the common patterns 1110 used by the channel change banner and the knowledge of what channel the STB will be tuned to are used by the frame recognition module 135 (FIG. 2, FIG. 3) for determining where the channel number and the channel name are displayed, as well as the program name, duration, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

The embodiments have been described with reference to flow chart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flow chart and/or block diagram. Each block in the flow chart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

Computer program instructions representing the block diagram and/or flow charts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for user tracking, comprising:
   capturing one of multiple frames viewed on a display device connected to an electronic device;
   matching a pattern of the captured frame with a frame template by searching a plurality of frame templates based on a cropped image;
   extracting information from the captured frame based on the matched frame template; and
   tracking user behavior based on the extracted information.

2. The method of claim 1, further comprising:
   providing the multiple frames from a source to the electronic device; wherein the source comprises one or more of a set-top box (STB), a disc player, a game console, a digital streaming device, a browser, a broadcast provider, a programming provider, and a computing device.

3. The method of claim 2, wherein said capturing the one of the multiple frames viewed on the display device comprises automatically capturing the one of the multiple frames based on an event, wherein the event is one or more of a periodic interval time period, a detected channel change, and a detected remote control signal.

4. The method of claim 3, wherein the plurality of frame templates are one of stored on the electronic device and stored in a cloud computing environment.

5. The method of claim 4, wherein each frame template of the plurality of frame templates comprises information for a particular screen layout.

6. The method of claim 5, wherein the information for the particular screen layout comprises one or more of an associated device, an associated application or an associated event, a first crop area used for pattern matching, an optical character recognition (OCR) mask for extracting information based on a masked area in a frame, a second crop area used for pattern matching and extracting information, training data used for OCR, and pre-processing information for pre-processing a frame.

7. The method of claim 6, wherein the extracted information comprises available text information included in the captured frame.

8. The method of claim 1, further comprising:
   reducing a search domain for searching the plurality of frame templates for matching the pattern.

9. The method of claim 8, wherein reducing the search domain comprises:
   determining an input source for the captured frame based on one or more of location for multi-system operators, type of input signal, type of content, type of device and input source resolution.

10. The method of claim 9, wherein matching the pattern of the captured frame with the frame template by searching the plurality of frame templates comprises determining a result of performing pixel level matching, and comparing the result to a threshold.

11. The method of claim 9, wherein matching-the pattern of the captured frame with the frame template by searching the plurality of frame templates comprises determining a result of frequency domain matching based on forward and reverse transformation for a cropped image.

12. The method of claim 4, wherein the plurality of templates are collected from a plurality of users and stored in a database in the cloud computing environment, wherein the plurality of templates are collected from each user based on extracting information from captured frames after a remote control command is activated, wherein programming banners on the captured frames are used for extracting the information.

13. The method of claim 1, further comprising applying optical character recognition (OCR) in the cropped image for extracting the information.

14. A system for user behavior tracking, comprising:
   an electronic device coupled to a display device, the electronic device comprising a frame recognition module that captures one frame of multiple frames displayed on the display device, matches a pattern of the captured one frame with a frame template by searching a plurality of frame templates based on a cropped image, uses the matched frame template to extract information from the captured frame, and tracking user behavior based on the extracted information.

15. The system of claim 14, wherein the display device receives the multiple image frames from a source, wherein the source comprises one or more of a set-top box (STB), a disc player, a game console, a digital streaming device, a browser, a broadcast provider, a programming provider, and a computing device.

16. The system of claim 15, wherein the frame recognition module automatically-captures the one frame of the multiple frames based on an event, wherein the event comprises one or more of a periodic interval time period, a detected channel change, and a detected remote control signal.

17. The system of claim 16, wherein the plurality of frame templates are stored in a first memory, and the extracted information is stored in a second memory, wherein the first memory and the second memory are one of coupled to the electronic device and stored in a cloud computing environment.

18. The system of claim 17, wherein each frame template of the plurality of frame templates comprises information for a particular screen layout that comprises one or more of an associated device, an associated application or an associated event, a first crop area used for pattern matching, an optical character recognition (OCR) mask for extracting information based on a masked area in a frame, a second crop area used for pattern matching and extracting information, training data used for OCR, and pre-processing information for pre-processing a frame.

19. The system of claim 18, wherein the extracted information comprises available text information included in the captured frame.

20. The system of claim 19, wherein the frame recognition module filters the plurality of frame templates by detecting an input source for the captured frame based on one or more of location for multi-system operators, type of input signal, type of content, type of device used for providing the captured frame, and input source resolution.

21. The system of claim 20, further comprising a cloud computing environment that stores the plurality of templates in a database, wherein the plurality of templates are collected from each user by a respective electronic device based on extracting information from captured frames after a remote control command is activated, wherein programming banners on the captured frames provide the extracted information.

22. The system of claim 14, wherein the electronic device comprises a television device.

23. A non-transitory computer-readable medium having instructions which when executed on a computer perform a method comprising:
    capturing one of multiple display frames viewed on a display device connected to an electronic device;
    matching a pattern of the captured frame with a frame template by searching a plurality of frame templates based on a cropped image;
    using the matched frame template to extract information from the captured frame; and
    tracking user behavior based on the extracted information.

24. The medium of claim 23, further comprising:
    providing the multiple display frames from a source to the electronic device, wherein the source comprises one or more of a set-top box (STB), a disc player, a game console, a digital streaming device, a browser, a broadcast provider, a programming provider, and a computing device.

25. The medium of claim 24, wherein capturing the one of the multiple display frames comprises automatically capturing the one of the multiple display frames based on an event, wherein the event is one or more of a periodic interval time period, a detected channel change, and a detected remote control signal, and the plurality of frame templates are one of stored on the electronic device and stored in a cloud computing environment.

26. The medium of claim 25, wherein each frame template of the plurality of frame templates comprises information for a particular screen layout that comprises one or more of an associated device, an associated application or an associated event, a first crop area used for pattern matching, an optical character recognition (OCR) mask for extracting information based on a masked area in a frame, a second crop area used for pattern matching and extracting information, training data used for OCR, and pre-processing information for pre-processing a frame.

27. The medium of claim 26, wherein the extracted information comprises available text information included in the captured frame.

28. The medium of claim 27, further comprising:
    reducing a search domain for searching the plurality of frame templates for matching the pattern based on determining an input source for the captured frame based on one or more of location for multi-system operators, type of input signal, type of content, type of device and input source resolution.

29. The medium of claim 28, wherein matching the pattern of the captured frame with the frame template by searching the plurality of frame templates comprises determining a result of performing pixel level matching, and comparing the result to a threshold.

30. The medium of claim 28, wherein matching the pattern of the captured frame with the frame template by searching the plurality of frame templates comprises determining a result of frequency domain matching based on forward and reverse transformation for a cropped image.

31. The medium of claim 25, wherein the plurality of templates are collected from a plurality of users and stored in a database in the cloud computing environment, wherein the plurality of templates are collected from each user based on extracting information from captured frames after a remote control command is activated, wherein programming banners on the captured frames are used for extracting the information.

32. The medium of claim 23, wherein the electronic device applies optical character recognition (OCR) in the cropped image for extracting the information.

* * * * *